United States Patent [19]
Kenworthy et al.

[11] 3,911,109
[45] Oct. 7, 1975

[54] REARING CALVES

[75] Inventors: Raymond Kenworthy, Catworth; Philip Porter, Putnoe, both of England

[73] Assignee: Lever Brothers Company, New York, N.Y.

[22] Filed: Aug. 12, 1974

[21] Appl. No.: 496,781

Related U.S. Application Data

[63] Continuation-in-part of Ser. No. 297,524, Oct. 13, 1972, abandoned.

[30] Foreign Application Priority Data

Oct. 14, 1971  United Kingdom............. 47853/71

[52] U.S. Cl. .................................. 424/92; 424/92
[51] Int. Cl.$^2$.. A61K 23/00; C12K 3/00; C12K 5/00
[58] Field of Search ............................ 424/92

[56] References Cited
OTHER PUBLICATIONS

Sojka, Vet. Bull., 41(7):509-522, July, 1971, Enteric Diseases in new-born piglets calves and lambs due to Escherichia coli infection.
Vet. Bull. 41, No. 3197, No. 3205, (1971).
Vet. Bull., 40, No. 3762-3765, (1970).
Vet. Bull. 39, No. 935-936, No. 2775, No. 3195, (1969).
Vet. Bull., 38, No. 2959, No. 3416, No. 3912, (1968).
Maupas et al., Bull. Soc. Vet. Prat. Fr., 53:95-101, (1969), use of a oral non-pathogenic Escherichia coli strain to overcome the calf scour syndrome.

*Primary Examiner*—Shep K. Rose

[57] ABSTRACT

The resistance of calves to gastro-intestinal disorders due to infection by pathogenic *E. coli* species is improved by stimulating the calf intestine to produce antibodies to the bacteria. The endotoxins of such infective strains are introduced into the intestine by way of the mouth, for example in water or in a calf feed, preferably beginning early in the life of the calf, at the age of 4-10 days.

5 Claims, No Drawings

REARING CALVES

This application is a continuation-in-part of our co-pending application Ser. No. 297,524 filed Oct. 13, 1972 now abandoned.

This invention relates to the rearing of calves, and is specially concerned with providing a regime to reduce their susceptibility to disorders of the intestinal tract, particularly those disorders due to infection contracted after the first few days of life.

One such intestinal disorder to which calves are liable is that due to infection by pathogenic strains of the bacterium Escherichia coli, in particular those strains having the serotypes (International Serotype Classification) 08, 09, 015, 078, 0114, 0137 and 0139.

When the environment or diet of the calf is altered, for example when it is transported, re-housed or taken from the cow, the attendant stresses leave the calf's system less resistant to the proliferation of pathogenic organisms, and any *E. coli* that it may have ingested are likely to cause severe scouring (diarrhoea).

The present invention arises from our discovery that the calf intestine can be stimulated to produce antibodies to the pathogenic *E. coli* strains listed above by orally administering to the calf (as distinct from introducing into the blood stream, as by injection) the endotoxins of the organisms substantially free from the living organisms, at a daily dose which, as will be seen later, corresponds to the endotoxins in about $5 \times 10^9$ deactivated bacteria at the most.

In specifying as 'endotoxins' the material to be introduced into the calf intestine, we do not mean to exclude from that material the presence of exotoxins or the presence of the cellular material within which the endotoxins are enclosed in the living bacterium; we mean merely that the endotoxins are of primary importance in obtaining the desired immunological effect while the exotoxins and cell debris are not. However, it will on occasion be convenient to leave either exotoxins or cell debris or both associated with the endotoxins; first, to save the trouble of separating them; and secondly, to enable such antigenic capacity as they possess to be utilised.

Feeding the calf with the endotoxins of one only of the aforesaid *E. coli* strains has some beneficial effect, insofar as the capacity of that strain to cause harm will then be reduced. However, it is preferable to administer the endotoxins of all the *E. coli* strains. The endotoxins to be administered can be obtained by culturing each strain (a sample of each of which is obtainable from the Central Veterinary Laboratory, Ministry of Agriculture and Fisheries, New Haw, Weybridge, Surrey, UK or from the National Collection of Type Cultures), and when growth of the micro-organism — and hence production of endotoxins — has proceeded to a suitable extent, to kill the proliferating micro-organisms, and release the endotoxins. This can be done by boiling or autoclaving. The whole sterilised cultures, each of which contains exotoxins and cell debris as well as endotoxins, can then be combined and administered. Alternatively, however, instead of sterilising the whole cultures, the bacteria are separated (conveniently by centrifuging) and treated in a small volume of an aqueous medium (for example, water or saline) to kill the bacteria and cause release of endotoxins.

The simplest and most economic way of killing the separated bacteria is by heating. If heating is sufficiently prolonged — for example, 1 hour at 100°C, 20 minutes at 125°C — much of the endotoxin is freed from association with the cell walls of the killed bacteria and released into the medium in which heating is carried out. The residual bound endotoxins can if desired be brought into solution by treatment with an enzyme such as trypsin.

Although administration of the endotoxins to the calf can be simply by forced dosing with sterilised culture material, or via the drinking water, it is preferred to administer them in solid or liquid form mixed with one or more of the essential components of the diet of calves, that is to say, protein, carbohydrate, cargohydrate, vitamins and mineral elements (for example, calcium and phosphorus). Thus the endotoxins may for administration be mixed with skim milk powder, cereal or mineral elements, or may be incorporated in a complete feed i.e. one containing all the essential components (protein, fat etc.) of the diet.

The invention has particular application in improving the resistance to infection of calves when they are taken from the cow and are accordingly specially subject to stress. By beginning feeding of the endotoxin material at an early age, suitably 4 to 10 days, and preferably at the last feed time with the cow or shortly thereafter, and continuing for an appropriate period, suitably up to 4–6 weeks of age, the calf intestine can be stimulated to produce the appropriate antibodies, so that by the time the calf is exposed to serious risk of infection, there is a high enough antibody circulation in the intestine either to cope with the proliferation of any ingested pathogenic bacteria or at least to reduce the severity of any disease state that does develop. The endotoxin material can for this purpose be incorporated in a so-called "milk replacer", that is to say a feed specially formulated to meet the nutrient requirements of calves when they are taken from the cow. It can also be incorporated in the first dry feed, which is fed in conjunction with milk or milk replacer at weaning. It is convenient to market the endotoxins in the form of a dry solid pre-mix with one or more of the feed ingredients protein, fat, carbohydrate, or mineral elements, leaving the user to mix the pre-mix with the remaining ingredients of the feed.

If desired, feeds can be formulated containing endotoxins of the Salmonella strains *S. dublin* and *S. typhimurium* along with those of the *E. coli* strains.

Minimal dose rates are in the range 1 to 10 units of the endotoxins of each bacterial serotype per calf per day. However, we have observed that calves dosed at 1000 times this level showed no ill effects. A very suitable level for inclusion in a calf feed is 10 to 1000 units of the endotoxins of each serotype per kg of feed. Units are measured as follows:

Preparation and isolation of endotoxin as standard of measurement

Endotoxins can be prepared from the bacterial strains by the following method, which is generally in accordance with the method of Westphal, Luderitz and Bister (1952) *Z. Natur. Forsch.* 7, 148.

A freeze-dried culture of the micro-organism is reconstituted in peptone water and incubated at 37°C for 6 hours. After suitable growth the culture is checked for purity on a washed sheep blood agar plate, and then used to inoculate slopes of Nutrient Agar (Oxoid) in Roux flasks. The culture is grown at 37°C overnight and the bacteria are harvested in sterile distilled water. The bacterial suspension obtained is dispensed aseptically into 30 ml Universal bottles and centrifuged at 4,000 rpm for 10 minutes. The supernatant liquid is removed, and the residual pellet of bacteria is resuspended in 4 ml of sterile distilled water and then freeze-dried.

In order to isolate endotoxins, 0.5 g of the freeze-dried material is suspended in 5 ml of 0.15M NaCl, and 10 ml of 90% aqueous phenol is added as lysing agent. The mixture is heated at 68°C for 30 minutes with continuous agitation, following which it is centrifuged at 4,000 rpm to compact the cell debris. The aqueous phase is removed and cooled to 4°C, and to it are slowly added 10 volumes of ice-cold ethanol. The precipitate thus formed is redissolved in water, and nucleic acids are precipitated from the solution by addition of 2 volumes of ethanol, and removed. From the residual solution, endotoxins are precipitated by addition of a further 8 volumes of ethanol. They are separated by centrifugation, washed with ice-cold ethanol and redissolved in 0.15M NaCl. (This solution of endotoxins is referred to as Reagent 1.)

Assay of endotoxins a. Preparation of Antiserum

Specific hyperimmune sera ('antisera') are prepared in New Zealand White rabbits against washed heat-killed (100°C, 2½ hours) organisms of each of the E. coli and Salmonella serotypes.

Suspensions of the heat killed organism are prepared in 0.15M NaCl (approx $3 \times 10^9$ organisms/ml) and injected intravenously. The immunisation schedule begins with an injection volume of 0.1 ml and is continued on every fourth day with doubling volumes to 1.6 ml. The rabbits are bled 10 days following completion of the schedule, and the blood obtained is centrifuged. The upper layer of hyperimmune serum is collected. (This antiserum is referred to as Reagent 2.)

b. Measurement of Antibody (Anti-endotoxins) Activity in Antiserum

Sheep erythrocytes are sensitised by treating a 5% suspension of washed packed cells with an equal volume of the endotoxin solution Reagent 1 at 37°C for 30 minutes. The sensitised cells are separated by centrifugation, washed free from excess endotoxins, and re-suspended in 0.15M NaCl to form a 2.5% suspension of endotoxin-sensitised sheep erythrocytes. (This is referred to as Reagent 3.).

Reagent 2 (the antiserum) is serially diluted with 0.15M NaCl to obtain a series of solutions of equal volume (1 vol) of antibody concentration 1/5, 1/10, 1/20, 1/40 ... $1/(5 \times 2^{n-1})$ that of Reagent 2, and to each of these solutions is added one-fifth vol of Reagent 3. Haemagglutination occurs in the stronger antiserum solutions and not in the weaker ones, and the end-point of the titration (assessed at 4°C) is taken as that solution in which haemagglutination only just occurs. In a typical procedure, the end point might be at the twelfth solution i.e. at the solution having an antibody concentration $1/(5 \times 2^{11})$ that of Reagent 2. Reagent 2 would be said to have an antiserum titre of $5 \times 2^{11}(=10,240)$.

c. Measurement of Endotoxins Concentration in Solution of Unknown Concentration

The solution (Y) to be assayed is serially diluted with 0.15M NaCl to obtain a series of solutions of equal volume (3 vols) of endotoxins concentration 1/3, 1/6, 1/12, 1/24 etc. that of the solution Y. To each of these solutions is added 1 vol of Reagent 2 (antiserum) diluted so as to have a titre of 20 (see (b.) earlier), and then (after a few minutes) 1 vol of Reagent 3 (sensitised sheep erythrocytes) giving final endotoxin concentrations 1/5, 1/10, 1/20 ... $1/(5 \times 2^{n-1})$ that of solution Y. Haemagglutination is inhibited in the stronger endotoxin solutions but does occur in the weaker ones, and the end-point of the titration is taken as that solution in which haemagglutination is only just inhibited. In a typical procedure this might be at the sixth solution, of endotoxins concentration $1/(5 \times 2^5)$ that of solution Y. Solution Y would then be said to have a titre of $5 \times 2^5 (= 160)$, equivalent to 160 units of endotoxin per ml.

EXAMPLE

A. Preparation of Crude Endotoxin Material

The following procedure was separately followed for each of the E. coli serotypes and the Salmonella strains earlier referred to.

i. The bacterium was streaked out from a depository stock culture onto washed blood agar plates (for E. coli) or nutrient agar plates (for Salmonella) and incubated at 37°C for 24 hours. The plates were then conventionally checked for purity of strain.

ii. Colonies of the bacterium were transferred from the plates to 50 ml of Oxoid Nutrient Broth No. 2 (Catalogue No. CM 67). The broth was held at 37°C for 24 hours.

iii. The whole culture obtained in (ii) was used to inoculate 1½ litres of Oxoid Nutrient Broth No. 2, and the broth was incubated, with shaking, at 37°C for 24 hours. Each final culture thus produced contained $10^9 - 10^{10}$ viable bacteria/ml. Samples of the E. coli cultures, when steamed at 125°C for 2 hours and submitted to the assay procedure set out earlier, gave a titre of 2560, corresponding to 2560 units of endotoxin per ml of steamed culture. Samples of the S dublin and S. typhimurium cultures, when steamed and assayed similarly to the E. coli cultures, each gave a titre of 1280. Each of the 9 cultures (7 of E. coli, and one of each of the Salmonella serotypes) was centrifuged to separate the bacteria, which were then re-suspended in part of the separated supernatant liquor to obtain a suspension of concentration 30 times that of the culture before centrifugation. Each suspension was separately steamed for 2 hours in an autoclave (125°C) to kill the bacteria, and the 9 steamed suspensions were pooled.

B. Preparation of Calf Feed

The pooled steamed material (1 part by weight) obtained from A was mixed with whey powder (19 parts) and the resulting mixture was incorporated in a conventional milk replacer of the following composition:

|  | % by weight |
|---|---|
| Skim milk powder with added fat | 77 |
| Whey powder | 17.1 |
| Glucose | 5 |
| Precipitated chalk | 0.3 |
| Dicalcium phosphate | 0.4 |
| Trace minerals & vitamins in carrier | 0.2 |
| to obtain a product in which the concentration of the endotoxins was: | |
| Endotoxins of each E. coli serotype | 100 units/kg of feed |
| Endotoxins of each Salmonella serotype | 50 units/kg of feed |

What is claimed is:

1. A method of immunising a calf against disorders of the intestinal tract, comprising causing the calf to eat or drink an orally non-toxic composition comprising the endotoxins of one or more pathogenic strains of the bacterium *E. coli*, said strains having the serotypes 08,09,015,078,0114,0137 or 0139, said endotoxins being stable to heating at 100°C and released by heat sterilization of the bacterium and thereby being substantially free from the living *E. coli* organisms and being administered to the calf in amounts sufficient to stimulate the intestine of said calf to produce antibodies to said pathogenic *E. coli* organisms, said amounts corresponding to a daily dose in the range 1–1,000 units of the endotoxins of each serotype.

2. A method according to claim 1, in which administration of the endotoxins is begun at the age of 4–10 days.

3. A method according to claim 1, in which the endotoxins are administered in water.

4. A method according to claim 1, in which the endotoxins are administered in a calf feed.

5. A calf feed which contains protein, fat, carbohydrate, vitamins and mineral elements and incorporates the endotoxins of one or more pathogenic strains of the bacterium *E. coli*, said strains having the serotypes 08, 09, 015, 078, 0114, 0137 or 0139, said endotoxins being stable to heating at 100°C and substantially free from the living E. coli organisms and released by heat sterilization of the bacterium and thereby being being present in amounts in the range 10–1,000 units of the endotoxins of each serotype per kilogram of feed.

* * * * *